(12) United States Patent
Wang

(10) Patent No.: US 6,781,626 B1
(45) Date of Patent: Aug. 24, 2004

(54) SYSTEM AND METHOD OF COLOR INTERPOLATION

(75) Inventor: H. Taichi Wang, Thousand Oaks, CA (US)

(73) Assignee: Biomorphic VLSI, Inc., Thousand Oaks, CA (US)

( * ) Notice: Subject to any disclaimer, the term of this patent is extended or adjusted under 35 U.S.C. 154(b) by 0 days.

(21) Appl. No.: 09/482,844

(22) Filed: Jan. 13, 2000

(51) Int. Cl.$^7$ .......................... H04N 3/14; H04N 5/335; H04N 9/04; H04N 9/083
(52) U.S. Cl. .................................... 348/273; 348/222.1
(58) Field of Search ................................ 348/273, 280, 348/252, 278, 276, 277, 272, 222.1; 382/300, 173, 180, 199; 358/525

(56) References Cited

U.S. PATENT DOCUMENTS

| | | | |
|---|---|---|---|
| 3,971,065 A | 7/1976 | Bayer | |
| 4,595,946 A | 6/1986 | Uehara et al. | |
| 4,736,241 A | 4/1988 | Murakami et al. | |
| 4,962,419 A | 10/1990 | Hibbard et al. | |
| 5,008,739 A | 4/1991 | D'Luna et al. | |
| 5,216,493 A | 6/1993 | DiBella et al. | |
| 5,373,322 A | 12/1994 | Laroche et al. | |
| 5,382,976 A | 1/1995 | Hibbard | |
| 5,471,515 A | 11/1995 | Fossum et al. | |
| 5,485,202 A | 1/1996 | Ueda | |
| 5,530,474 A | 6/1996 | Takei | |
| 5,568,195 A | 10/1996 | Suzuki | |
| 5,587,596 A | 12/1996 | Chi et al. | |
| 5,805,217 A | * 9/1998 | Lu et al. | ...................... 348/273 |
| 6,295,087 B1 | * 9/2001 | Nohda | ........................ 348/234 |

* cited by examiner

Primary Examiner—Wendy R. Garber
Assistant Examiner—Matthew L Rosendale
(74) Attorney, Agent, or Firm—Pillsbury Winthrop LLP

(57) ABSTRACT

A system and method of processing data associated with an array of pixels arranged in two dimensions are disclosed. The data includes a value representative of an intensity of photoexposure in one of a plurality of distinct spectral regions for each pixel location in the array. For at least one pixel location being associated with a first one of the plurality of spectral regions, a direction for interpolation is selected based upon an intensity gradient at the pixel location and an intensity continuity bias representative of a trend in changes in intensity in a neighborhood in the array of pixels about the pixel location. An interpolation among values representative of an intensity of photoexposure at two or more neighboring pixel locations in at least one set of neighboring pixels aligned along the selected direction to provides a value associated with the at least one pixel location which is representative of an intensity in a second one of the plurality of spectral regions distinct from the first spectral region.

32 Claims, 9 Drawing Sheets

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

Figure 2A

| G | R | G | R | G | R | G | R |
|---|---|---|---|---|---|---|---|
| B | W | B | W | B | W | B | W |
| G | R | G | R | G | R | G | R |
| B | W | B | W | B | W | B | W |
| G | R | G | R | G | R | G | R |
| B | W | B | W | B | W | B | W |
| G | R | G | R | G | R | G | R |
| B | W | B | W | B | W | B | W |

Figure 2B

| Y | C | Y | C | Y | C | Y | C |
|---|---|---|---|---|---|---|---|
| M | W | M | W | M | W | M | W |
| Y | C | Y | C | Y | C | Y | C |
| M | W | M | W | M | W | M | W |
| Y | C | Y | C | Y | C | Y | C |
| M | W | M | W | M | W | M | W |
| Y | C | Y | C | Y | C | Y | C |
| M | W | M | W | M | W | M | W |

SYSTEM AND METHOD OF COLOR INTERPOLATION

BACKGROUND

1. Field of the Invention

The embodiments described herein relate to image processing techniques. In particular, these embodiments relate to reconstructing a color image from data extracted from an imaging array.

2. Related Art

Because of the tri-stimulus nature of human color perception, to reconstruct a color image of a scene it is typically necessary to recover at least three color components (typically red, green, and blue or cyan, magenta, and yellow) for each picture element (pixel) in the image. Ideally, each photo-detector in the imaging device captures co-aligned red, green, and blue data creating a dense color image. This would eliminate the need for color reconstruction. However, such a system is not feasible due to the required complexity of the photo-detectors and the amount of data that would have to be drawn off of the imaging device. An alternative approach is to have each photo detector gather data for a single color creating a sparse color image. Given a known color filter array (CFA) pattern such as a Bayer pattern as described in U.S. Pat. No. 3,971,065 to Bayer, the remaining two colors for each pixel location can be reconstructed using data from neighboring photo detector sites.

Single-sensor electronic cameras employing color filter arrays are widely used for the creation of color imagery. In a color filter array of photo-detectors such as the aforementioned Bayer pattern array, each photo-detector site (pixel) provides information for a single color. For the color image to be of use it is typically converted to a dense color image having data for all three colors at each pixel location. Since there is incomplete color information at each pixel (photo-detector) location, certain assumptions about the image have to be made in order to "recover" the missing colors. One such assumption is that an object in the physical world usually gives rise to image intensities that vary smoothly over the image of the object. In order to economize processing resources, interpolation is typically based upon color information at photo-detectors in a small neighborhood around each pixel.

U.S. Pat. Nos. 5,373,322 and 5,382,976 illustrate bilinear single and two dimensional interpolation algorithms. These algorithms rely on local gradients to select a direction for interpolation between neighboring pixel values. Unfortunately, these methods may provide distortions at image object boundaries where the smoothness assumption breaks down. Not only do these algorithms provide images which tend to be blurred, these algorithms may introduce false or incorrect colors at regions in the image where the smoothness assumption does not apply. Therefore, there is a need for new techniques for providing more accurate color reconstruction in images with high spatial frequency components.

SUMMARY

An object of an embodiment of the present invention is to provide a method and system for color interpolation.

It is another object of an embodiment of the present invention to provide a system and method of accurately reconstructing a color image with high spatial frequency components from data provided by an imaging array.

It is another object of an embodiment of the present invention to provide a system and method of accurately reconstructing a color image at object boundaries in an original scene.

It is yet another object of an embodiment of the present invention to provide system and method of determining an appropriate dimension in which to perform color interpolation at specific pixel locations in image data provided by an imaging array.

Briefly, an embodiment of the present invention is directed to a method and system of processing data associated with an array of pixels arranged in two dimensions. The data includes a value representative of an intensity of photoexposure in one of a plurality of distinct spectral regions for each pixel location in the array. For at least one pixel location being associated with a first one of the plurality of spectral regions, a direction for interpolation is selected based upon 1) an intensity gradient at the pixel location and 2) an intensity continuity bias representative of a trend in changes in intensity in a neighborhood in the array of pixels about the pixel location. The method then involves interpolating values representative of an intensity of photo-exposure at two or more neighboring pixel locations in at least one set of neighboring pixels aligned along the selected direction to provide a value associated with the at least one pixel location. This value is representative of an intensity in a second one of the plurality of spectral regions distinct from the first spectral region.

By selecting a direction for interpolation based upon the continuity bias in the neighborhood about the pixel location, in addition to the intensity gradient at the pixel location, the interpolation process may be guided by the direction of image "flow" which may vary continuously except at object boundaries. The dimension of interpolation at any particular pixel location may then be selected as suggested by the intensity gradient at the pixel location unless the locally available evidence, such as evidence of an object boundary, indicates to the contrary. Preferably, the stronger local evidence of image flow in a first dimension, the higher a contrasting local gradient in a different second dimension must be to override the evidence of image flow in the first dimension.

BRIEF DESCRIPTION OF THE FIGURES

FIGS. 2A, 2B and 2C show embodiments of the imaging sensor shown in the embodiment of FIG. 1.

FIGS. 4A through 4D illustrate four cases for color interpolation for data provided by an imaging sensor in the embodiment of FIG. 2A.

FIG. 5 illustrates a process of determining a continuity map for pixel locations in image data.

FIG. 6 illustrates a process for determining a dimension for interpolation at pixel locations in an imaging sensor of the embodiment of FIG. 2A.

DETAILED DESCRIPTION

Embodiments of the present invention are directed to a system and method for reconstructing a multi-color image from image data collected at an imaging array which includes data for exactly one color for each pixel location, leaving missing color information at each pixel location. According to an embodiment, the missing color information at each pixel location is recovered by interpolating among neighboring pixels having the missing color information which are aligned in a selected interpolation direction. The interpolation dimension for particular pixel locations is preferably based upon not only an intensity gradient at the particular pixel locations, but also a measure of a trend in changes in the intensity in a neighborhood about the particular pixel locations. This enables an accurate reconstruction in portions of a color image where the corresponding scene has high spatial frequency components such as object boundaries.

Figure 1:
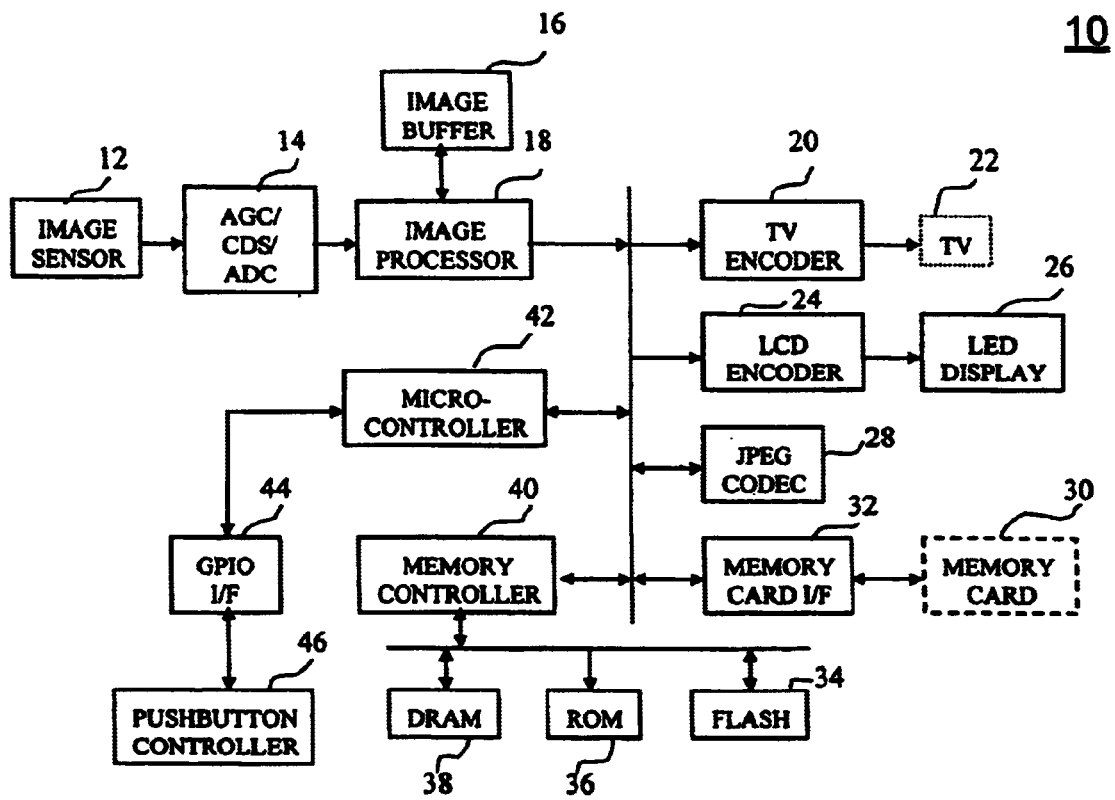
FIG. 1 shows a schematic block diagram of an electronic camera system according to an embodiment.

FIG. 1 shows a block diagram for an electronic camera system according to an embodiment. An imaging sensor 12 is preferably an electronic sensor receiving an image focused thereon by an optical system (not shown). The imaging sensor 12 may include a semiconductor substrate with transmissive filters deposited over selected locations to form pixels. Each pixel is sensitive to photoexposure in a particular spectral region defined by the transmissive properties of the transmissive filter deposited over the associated pixel location. The semiconductor substrate includes circuitry for extracting data which is representative of an intensity of photoexposure of particular pixel elements over an exposure period. The semiconductor substrate may be formed as a charge couple device (CCD) or an active pixel sensor (APS) as described in U.S. Pat. Nos. 5,471,515 and 5,587,596.

Circuitry at section 14 performs functions for automatic gain control, correlated double sampling and analog-to-digital conversion functions to provide digital data representative of the intensity of the photoexposure of pixel elements at specific locations on the imaging sensor 12. For embodiments in which the imaging sensor 12 is of an APS design, the intensity values representative of the photoexposure of the pixel elements in the array may be extracted using pixel readout circuitry described in U.S. patent application Ser. No. 09/274,424, entitled "Pixel Read-Out Architecture," filed on Mar. 22, 1999, assigned to Biomorphic VLSI, Inc., and incorporated herein by reference.

An image processor 18 receives raw digital sensor data captured at the imaging sensor 12 and transforms the raw digital sensor data into a full color image. For color image data defining three colors at each pixel location and representing the pixel intensity value for each color at that pixel location with one eight bit value, each pixel location in the full color image is associated with 24 bits of data to define the intensity values at each of the three spectral regions associated with the respective three colors in the image. Other embodiments may represent pixel intensity values with ten, twelve or more bits with an associated multiple of bits representing the total information at the pixel location. Thus, for a three-color image, the image processor 18 preferably provides three overlapping arrays or sub-images of pixel data, each array containing all of the pixel intensity values for an associated color channel.

FIG. 1 depicts the image sensor 12, circuitry at section 14 and image processor 18 as separate functions. In one embodiment, these functions may be performed by three corresponding separate integrated circuits. In other embodiments, the image sensor 12, circuitry at section 14 and image processor 18 may be integrated into the same semiconductor substrate. In other embodiments, portions of the functionality of the image processor 18 may be formed in the same semiconductor substrate as the image sensor 12 and the circuitry at section 14 while other portions of the functionality may be formed in a separate semiconductor substrate.

As discussed below with reference to FIG. 3, the image processor 18 executes several processes for transforming the raw digital sensor data into a full color image. According to an embodiment, the image processor 18 reads from, and writes to an image buffer 16 during intermediate computations and manipulations of the image data. The image processor 18 may execute the processes for transforming the raw digital sensor data by any one of several commercially available programmable RISC processors or digital signal processors. Alternatively, the image processor 18 may have an application specific integrated (ASIC) circuit design.

A JPEG codec 28 may provide data compression. Instructions executed by a microcontroller 42 may be stored in a read-only memory (ROM) 36. DRAM 38 or flash memory 34 may store data representative of images processed at the image processor 18. A memory card 30 may then store finished images, serving as an electronic "film," through a memory card interface block 32. An LCD display 26 provides a view finder while a photographer is taking pictures. A serial interface such as an RS-232 serial port or a universal serial bus (USB) (not shown) may couple the electronic camera system 10 to a personal computer system. A television encoder 20 may also couple the electronic camera system 10 to a television set 22.

FIG. 2A shows an embodiment of the imaging sensor 12 which includes pixels for extracting color information in red, green and blue spectral regions. The letters R, G and B represent locations of red, green and blue pixels, respectively. As pointed out above, pixels may be formed by depositing a transmissive filter over specific pixel locations as described in detail in U.S. patent application Ser. No. 09/274,413, entitled "Color Filter Pattern," filed on Mar. 22, 1999, assigned to Biomorphic VLSI, Inc., and incorporated herein by reference. The color pattern of pixels distributed over the imaging sensor 12 is shown as having a typical Bayer pattern which is described in U.S. Pat. No. 3,971,065.

FIG. 2B shows an alternative embodiment of the imaging sensor 12 with a red, green, blue and white color pattern where the letters R, G, B and W represent locations of red, green, blue and white pixels, respectively. As discussed in the aforementioned U.S. patent application Ser. No. 09/274,413, the white pixels may be formed in a semiconductor imaging device by maintaining an absence of a transmissive filter deposited over white pixel locations while associated transmissive filters are deposited over the red, green and blue pixel locations.

FIG. 2C shows an additional embodiment of the imaging sensor 12 with a four color filter pattern having different colors such as cyan, magenta, yellow and white, where the letters C, M, Y and W represent locations of cyan, magenta, yellow and white pixels, respectively.

Figure 3:
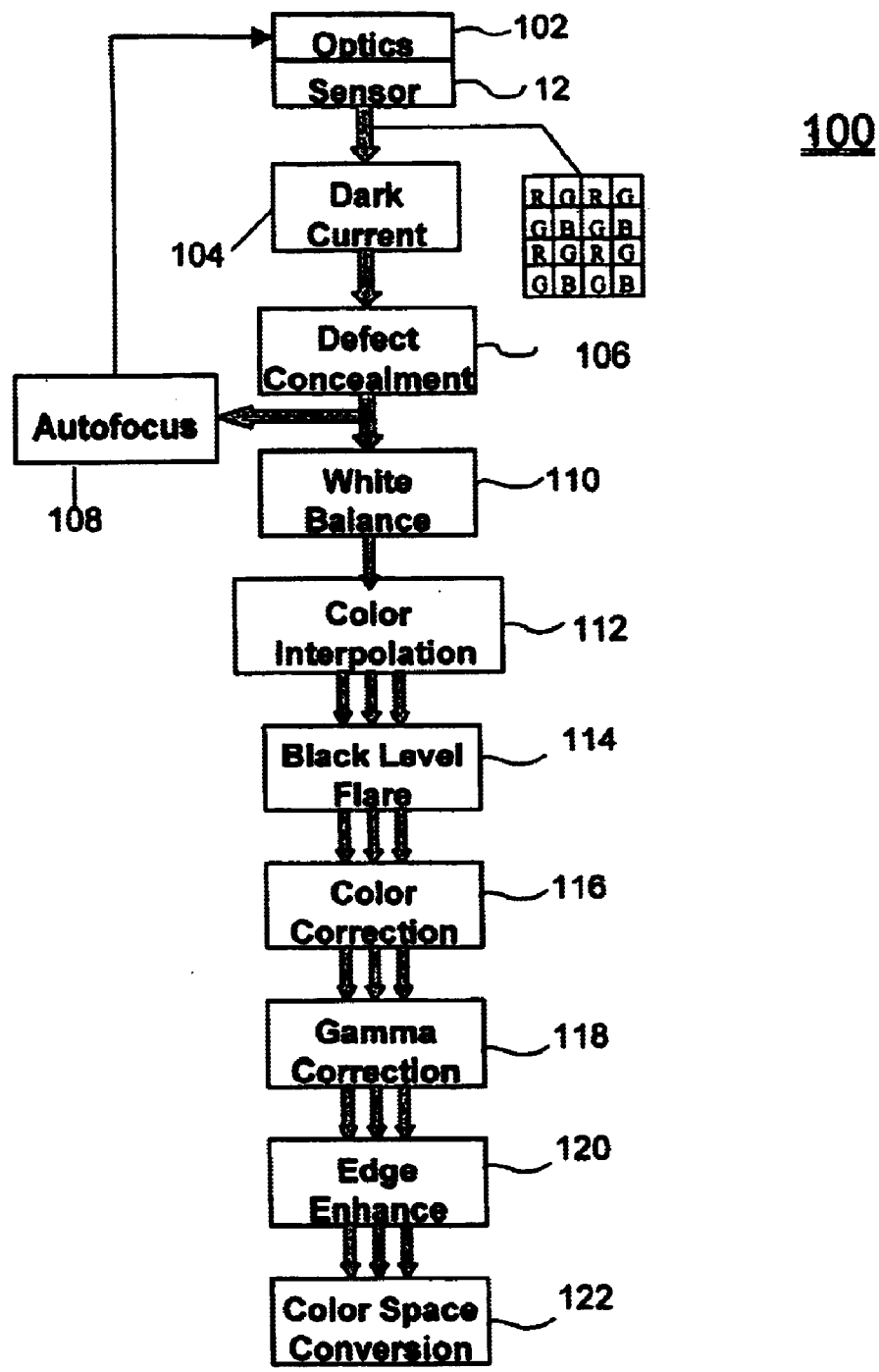
FIG. 3 is a functional flow diagram illustrating processes executed at the image processor shown in FIG. 1 according to an embodiment.

FIG. 3 illustrates a process for providing finished color images from raw digital sensor data. Steps 110 through 122 are preferably performed at the image processor 18 (FIG. 1). According to an embodiment, the image processor 18 performs the steps 110 through 122 with logic circuitry formed in an ASIC (e.g., when the image processor 18 is formed in the same semiconductor substrate as the circuitry of section 14 and image sensor 12). Such logic circuitry may be formed in an ASIC using Verilog or VHDL tools. In other embodiments, the image processor 18 performs the steps 110 through 112 by executing algorithms encoded into computer readable instructions. The image processor 18 may retrieve the computer readable instructions from the ROM 36 or DRAM 38 or the computer readable instructions may be stored in a programmable ROM (not shown) which is a part of the image processor 18. In other embodiments, the image processor 18 may retrieve the computer readable instructions from a peripheral memory device such as the flash 34, a hard disk drive (not shown) or a floppy disk drive (not shown).

A dark current correction section 104 subtracts dark current components in the raw sensor data received from the imaging sensor 12. Invariably, some of the pixels in the imaging sensor 12 may be defective. A defect concealment section 106 compensates for these defects by, for example, interpolating from neighboring pixels of the same color or replacing the data from the defective pixel with that of the nearest neighboring non-defective pixel of the same color. A defect map is preferably stored in a memory (such as the image buffer 16) to maintain a record of a defective pixel in the imaging sensor 12.

FIG. 3 illustrates a process of white balancing at step 110 followed by a process of color interpolation at step 112. White balancing at the step 110 includes the calculation of gain coefficients to be applied to the pixel intensity data from each of the color channels to correct for unbalanced color information in the image data resulting from, among other things, unbalanced ambient lighting. Techniques for white balancing are known to those of ordinary skill in the art as discussed in U.S. Pat. Nos. 5,530,474; 5,485,202; 5,216,493; 4,736,241 and 4,595,946.

Embodiments of the imaging sensor 12 illustrated in the above mentioned U.S. patent application Ser. No. 09/274,413 receive color intensity information at each pixel location data for a distinct color or spectral region. Therefore, at any particular pixel location color information is collected for a single color. Color information for the other color channels is not collected at the particular pixel location. The process of color interpolation at step 112 provides pixel intensity value for each of the color channels at each pixel location by interpolating color image data from among neighboring pixels to provide the missing color information as described according to embodiments below with reference to FIGS. 4 through 8. Alternatively, this may be performed by a process of color selection whereby the imaging sensor 12 provides color information for one particular color channel at a particular pixel location, and color data extracted at adjacent pixel locations provides the color information for the other color channels as described in U.S. patent application Ser. No. 09/482,270, entitled "Color Selection for Sparse Color Image Reconstruction," filed concurrently herewith, assigned to Biomorphic VLSI, Inc., and incorporated herein by reference.

At step 114, the image processor 18 performs black level flare processing to remove any bias in the intensity values resulting from, for an example, an overexposure due to camera flash. Such black level flare processing may be performed using algorithms which are well known in the art. Each pixel of a particular color or spectral region may also be responsive to photon energy which is outside of the spectral region associated with the pixel, introducing a color error. At step 116, the image processor 18 performs color correction to account for any such errors in the pixel data.

The image processor 18 may then perform a gamma correction process at step 118 which compensates for non-linearities in display devices. Here, the image data may be adjusted for a display onto a CRT device such as a television screen or computer monitor using a standard gamma of 2.2, as specified in the ITU-RBT.709 standard.

The processes of color interpolation at step 112 may blur certain edges in the image. Step 120 may enhance edges in the image which may have been blurred in the color interpolation processing.

Finally, the image processor 18 converts the color channels of the digital image, red, green and blue, for example, to a different color space such as YCbCr color space. The embodiment of FIG. 3 shows the process of white balancing at step 110 occurring prior to the process of color interpolation at step 112. Here, the white balancing process at step 110 provides image data of a single color at each pixel location corresponding with the arrangement of pixel colors on the imaging sensor 12. The process of color interpolation then converts this image data into data representative of multiple overlapping sub-images corresponding to the number of different colors of pixels on the imaging sensor 12. Each of these sub-images includes data representative of pixel intensity at each location in the sub-image for a color or spectral region associated with the sub-image. Thus, in the embodiment of the imaging sensor 12 as shown in FIG. 2A, the color interpolation process at step 112 will provide data representative of three sub-images corresponding to red, green and blue.

In an alternative embodiment, the process of color interpolation may precede the process of white balancing. Here, immediately following the process of defect concealment at step 106, the color interpolation process converts the image data with pixel data for a single color at each pixel location into multiple overlapping sub-images. The process of white balancing is then performed over the data representative of all of the sub-images provided by the color interpolation process.

Embodiments of the present invention are directed to a system and method for performing the color interpolation at step 112 as shown in the embodiment of FIG. 3 and, in an alternative embodiment, performing color interpolation prior to white balancing at step 110.

FIGS. 4A through 4D illustrate four distinct cases of pixels from an imaging array according to the embodiment shown in FIG. 2A. Each of FIGS. 4A through 4D illustrate single color image data at nine pixel locations for a 3×3 pixel neighborhood prior to color interpolation. Embodiments of the present invention are directed to processes for color interpolation to provide color image data for each color at each pixel location. By example, embodiments described below are directed to determining multi-color image data for each of the center pixels in each of the four cases shown in FIGS. 4A through 4D by interpolating among pixel values in these nine pixel regions.

FIG. 4A shows that the image data for the center pixel represents an intensity photoexposure at the corresponding pixel location of the imaging array in a blue spectral region. In addition to having the color image data at the center pixel location for blue, it is desirable to have color image data for green and red based upon the color image data collected at neighboring pixel locations. FIG. 4B illustrates a case similar to that shown in FIG. 4A except that the image data for the center pixel is representative of photoexposure in a red spectral region in the imaging array. It is desired to provide green and blue image data at that center pixel location by interpolating color image data collected at neighboring pixel locations.

FIGS. 4C and 4D illustrate two cases in which image data for the center pixel represents an intensity of photo exposure in the green spectral region at the center pixel location. In these-cases, the interpolation process is directed to providing color image data for red and blue in association with the center pixel location. In FIG. 4C, the green pixel is located in a pixel row which includes alternating red and green pixels while FIG. 4D illustrates a case where the center green pixel is located in a row of alternating blue and green pixels.

According to an embodiment, a decision is made as to whether interpolation is to be performed in a horizontal or vertical direction in each of the cases in FIG. 4A through 4D. In other words, the decision is to be made as to whether the missing color values for the center pixel is to be determined based upon interpolation of color image data of pixels located along a horizontal or vertical direction. In FIGS. 4A and 4B, for example, a decision can be made as to whether the missing color image data for green is to be determined by interpolating between the color image data at G1 and G3 (i.e., an interpolation in a vertical direction) or between green color image data at the G4 and G2 pixel locations (i.e., an interpolation in a horizontal direction). The respective interpolation directions in each of the illustrated cases may also be used in interpolating among neighboring red pixels to provide red pixel data for the center pixel of FIG. 4A and interpolating among neighboring blue pixels to provide blue color image data for the center pixel of FIG. 4B.

Figure 4E:
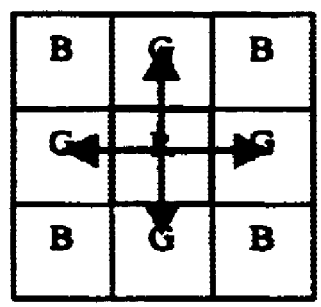
FIG. 4E illustrates a process of selecting an interpolation direction between a horizontal interpolation direction and a vertical interpolation direction for interpolating among a neighborhood of nine pixels.
Figure 4F:
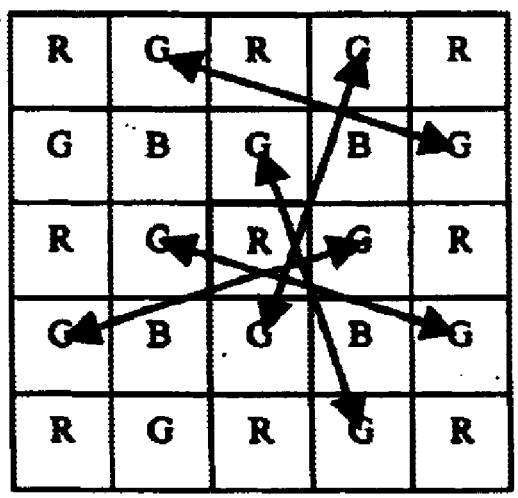
FIG. 4F illustrates a process of selecting a direction of interpolation from among more than two interpolation directions for interpolating from among a neighborhood of twenty-five pixels.

FIG. 4E illustrates arrows in the horizontal and vertical interpolation directions. FIG. 4F illustrates an alternative embodiment in which image data is determined for the center pixel based upon an interpolation among pixels in a 5×5 neighborhood of twenty-five pixels. Other embodiments may be directed to interpolating among 7×7 or larger pixel neighborhoods. In this embodiment, an interpolation direction may be selected from among more than two possible interpolation directions as illustrated in arrows shown in FIG. 4F.

According to an embodiment, a continuity measure $C(i, j)$ is determined for each pixel location $(i, j)$ in the imaging array. For interpolation in the cases illustrated in FIGS. 4A through 4D, the values of $C(i, j)$ may be expressed in integers where positive numbers represent an overall degree of continuity in the horizontal direction and negative numbers represent an overall degree of continuity in the vertical direction. An interpolation direction $D(i, j)$ may also be determined for pixel locations requiring a decision to interpolate in a horizontal or a vertical direction. FIG. 4E illustrates selectable horizontal and vertical interpolation directions for the case shown in FIG. 4B. In the embodiment illustrated with reference to FIGS. 4A through 4D, $D(i, j)$ is "one" to represent interpolation in a horizontal direction while a value of "zero" represents interpolation in a vertical direction. Interpolation algorithms may then apply the interpolation decision represented by $D(i, j)$ to interpolate either horizontally or vertically. In other embodiments, such as that illustrated in FIG. 4F, $D(i, j)$ may represent more than two values to indicate a selection of interpolation direction among more than two directions.

According to an embodiment, values of $D(i, j)$ are determined based upon a local intensity gradient at the location $(i, j)$ and a continuity bias representative of an intensity continuity trend in a neighborhood about the location $(i, j)$. This continuity bias may be calculated as a weighted sum of, selected continuity measures C in a neighborhood about the pixel location $(i, j)$. The local intensity gradient may determine the interpolation direction $D(i, j)$ for select pixel locations unless the continuity trend in the neighborhood about the pixel location $(i, j)$, as represented by the continuity bias, suggests to the contrary.

In an embodiment discussed with reference to FIGS. 5 through 8, a single pass process determines missing green, red and blue pixel values for the cases illustrated with reference to FIGS. 4A through 4D. In addition, this process determines continuity measure $C(i, j)$ and interpolation direction $D(i, j)$ for each pixel in the image data. Similar processes may be used for color interpolation among larger neighborhoods of pixels by selecting among more than two interpolation directions as illustrated with reference to FIG. 4F.

Figures 5, 6:
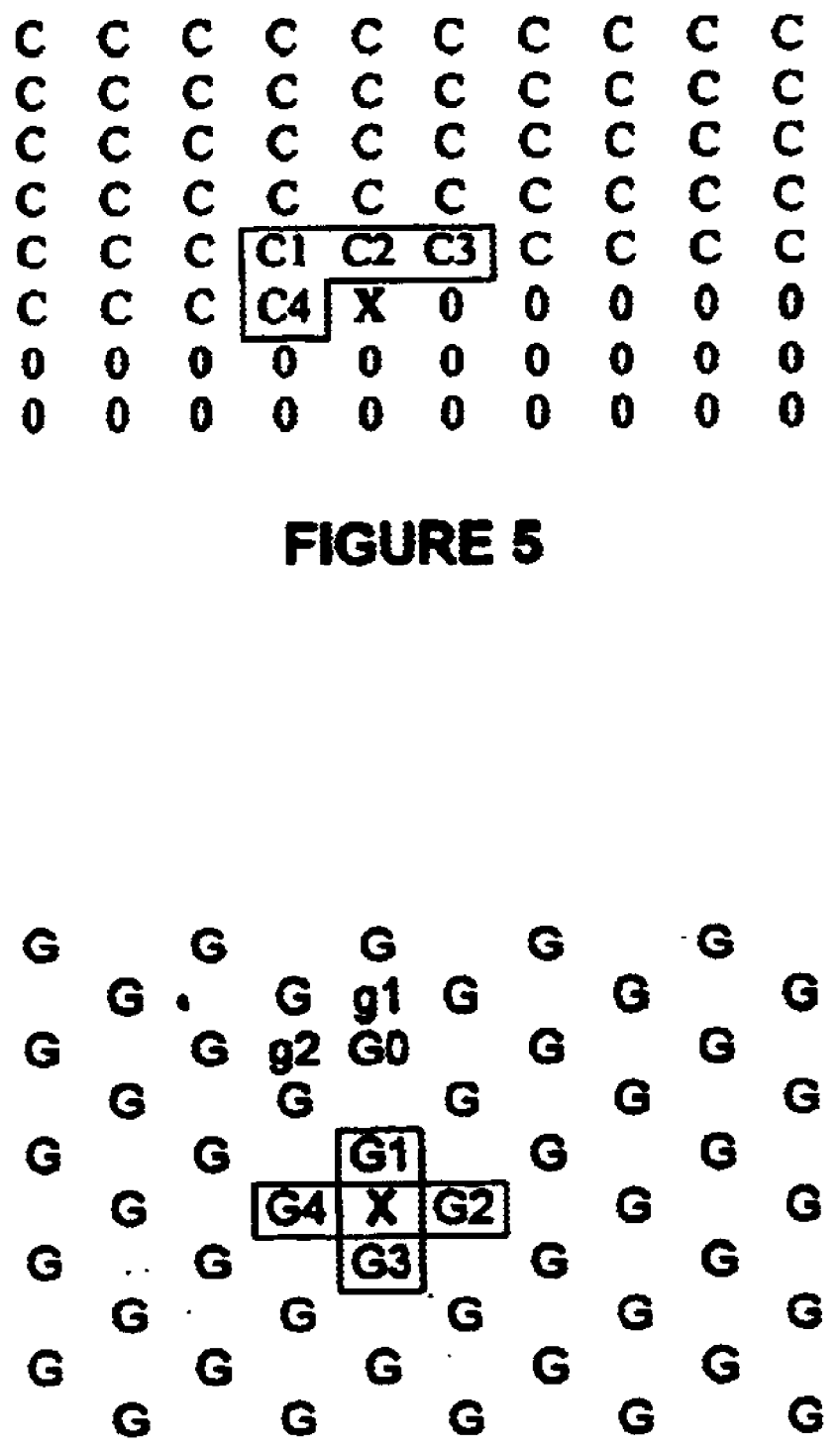

FIG. 5 illustrates a process of determining an interpolation direction $D(i, j)$ and a continuity measure $C(i, j)$ for either a red or blue pixel location $(i, j)$ for the cases illustrated in either FIG. 4A or FIG. 4B. FIG. 5 illustrates that continuity measures $C(i, j)$ have been calculated for all pixel locations up to a pixel location X which represents either a red or blue pixel location. Referencing the location of X at $(i, j)$, the abbreviated notations C1, C2, C3 and C4 represent the continuity measures of $C(i-1, j-1)$, $C(i, j-1)$, $C(i+1, j-1)$ and $C(i-1, j)$, respectively. FIG. 6 illustrates that the pixel location X (being red or blue) is adjacent to green pixels G1, G2, G3 and G4 which are shorthand notations for green intensity values for the pixel locations $G(i, j-1)$, $G(i+1, j)$, $G(i, j+1)$ and $G(i-1, j)$, respectively. An intensity gradient about the pixel location X is determined based upon the values G1, G2, G3 and G4. This gradient is then compared with a continuity bias which is determined from a weighted sum of the values C1, C2, C3 and C4. The following steps of pseudocode illustrate a process for determining the interpolation direction $D(i, j)$ and a continuity measure $C(i, j)$ for the center pixel location $(i, j)$ in the cases of FIGS. 4A or 4B:

```
100   Bc = a1 * C1 + a2 * C2 + a3 * C3 + a4 * C4  {continuity bias about (i,j)
      toward horizontal interpolation
110   dGy = |G1 - G3|  {vertical gradient component
120   dGx = |G2 - G4|  {horizontal gradient component
130   if (dGy - dGx + Bc >= 0) {    // interpolate horizontally if gradient in vertical
                                    direction does not overcome continuity bias in
                                    the horizontal direction
140       D(i,j) = 1
150       if (C4 > 0) {             // if C4 indicates continuity in horizontal
                                    direction
160           C(i,j) = C4 + 1
```

```
-continued

170         } else {                // if C4 indicates continuity in vertical
                                    direction, it is reset to 1
180             C(i,j) = 1
190         }
200         if (C(i,j) > Cmax), C(i,j) = Cmax
210     } else {                    // interpolate vertically
220         D(i,j) = 0
230         If (C2 < 0) {           // if C2 indicates continuity in vertical direction
240             C(i,j) = C2 - 1
250         } else {                // if C4 indicates continuity in
                                    horizontal direction, it is reset to -1
260             C(i,j) = -1
270         }
280         if (C(i,j) < - Cmax), C(i,j) = - Cmax
```

Step 100 determines a continuity bias Bc, indicating a trend in changes in intensity in a horizontal direction, as a weighted sum of the continuity measures C1, C2, C3 and C4 about the neighborhood of (i, j). The coefficients a1, a2, a3 and a4 are constants preferably determined through experimentation or empirical analysis. Steps 110 and 120 determine a vertical gradient component dGy and a horizontal gradient component dGx. Step 130 then determines whether a local gradient about the location (i, j) in a vertical direction does not overcome the continuity bias in the horizontal direction. Unless an overall local gradient in a vertical direction about the location (i, j) overcomes the continuity bias in the horizontal direction, the interpolation direction, D(i, j) is equal to 1, indicating that interpolation is to take place in a horizontal direction. If that is the case, the continuity measure C(i, j) is determined based upon the continuity measure C4 as illustrated in steps 150 through 200. Step 160 determines the continuity measure C(i, j) as an increase over the continuity measure C4 if the trend at the pixel location (i, j) is a continued trend of horizontal interpolation. Otherwise, step 180 assigns a value of 1 to C(i, j) if the trend at the pixel location (i, j) represents a change in trend from vertical interpolation to horizontal interpolation. Step 200 places an upper bound on the value C(i, j) to prevent indefinite growth of the local continuity measures.

Steps 220 through 280 are directed to the case where interpolation is to be performed vertically at the pixel location (i, j) as determined at step 130. Step 220 sets the value D(i, j) to zero to reflect that interpolation at the pixel location (i, j) is to be performed in the vertical direction. The continuity measure at the pixel location (i, j) is the continuity measure of C2 decremented by one if the value of C2 is less than zero (indicating a continued trend of vertical interpolation)or is reset to negative one if the value of C2 is greater than or equal to zero in trend (indicating a change from horizontal interpolation to vertical interpolation). In a manner similar to that performed at step 200, step 280 implements a lower bound on the value of C(i, j) to prevent indefinite growth of the continuity measures. Accordingly, the pseudocode steps 100 through 280 show how the values of C(i, j) and D(i, j) are determined at each of the blue and red pixel values of the center pixels in each of the cases at FIGS. 4A and 4B.

Following the determination of these values, the interpolated pixel value (i, j) is preferably determined according to D(i, j) for the red or blue pixel location as follows:

$$g(i,j)=(G2+G4)/2, \text{ if } D(i,j)=1 \quad (1)$$

$$g(i,j)=(G1+G3)/2, \text{ if } D(i,j)=0 \quad (2)$$

The steps of pseudocode 100 through 280 listed above illustrate an embodiment of determining the continuity measure C(i, j) and interpolation directions D(i, j) at red and blue pixel locations as shown in the center pixels of the cases shown in FIGS. 4A and 4B (for a 3×3 neighborhood embodiment). FIGS. 6, and steps of pseudocode 300 through 460 below illustrate a process of determining the continuity measure C(i, j) and interpolation direction D(i, j) for center green pixels (i.e., G0 or G(i, j)) shown in the cases of FIGS. 4C and 4D based upon previously interpolated color image data for green (i.e., g2 or g(i-1, j) and g1 or g(i, j-1)) at red and blue pixel locations as follows:

```
300     If [|g(i-1, j) - G0| < |g(i,j-1) - G0|] {
310         D(i,j) = 1
320         if (C4 > 0) {           // if C4 indicates continuity in horizontal
                                    direction
330             C(i,j) = C4 + 1
340         } else {                // if C4 indicates continuity in vertical
                                    direction, it is reset to 1
350             C(i,j) = 1
360         }
370         if C(i,j) > Cmax, C(i,j) = Cmax
380     } else {
390         D(i,j) = 0
400         If (C2 < 0) {           // if C2 indicates continuity in vertical direction
410             C(i,j) = C2 - 1
420         } else {                // if C4 indicates continuity in
430             C(i,j) = -1
440         }
450         if C(i,j) < - Cmax, C(i,j) = - Cmax
460     }
```

FIG. 6 illustrates a case of determining the continuity measure C(i, j) and interpolation direction D(i, j) for a green pixel location G0 for the cases corresponding to FIGS. 4C and 4D. Referencing the pixel location of G0 at (i, j), the previously interpolated green pixel values of g1 and g2 are located at pixel locations (i, j−1) and (i−1, j), respectively. Accordingly, g1 and g2 are shorthand notation for g(i, j−1) and g(i−1, j), respectively. In an embodiment in which color interpolation is performed in a hardware implementation, an "actual" green pixel value G(i−1, j−1) may be used in lieu of g(i, j−1) (an interpolated value) to simplify processing according to a pipelined processing structure. According to the embodiment of the pseudocode of steps 300 through 460, step 300 determines whether interpolation is to be performed horizontally or vertically based upon the comparison of the local intensity gradients in the horizontal and vertical direction using the previously interpolated green intensity values neighboring the pixel location (i, j) or other suitable neighboring actual green pixel values. If the condition of step 300 is met, interpolation is to be performed horizontally and the values of C(i, j) and D(i, j) ate determined according to steps of pseudocode 310 through 370 in a manner similar to that illustrated in this pseudocode listing above at steps 140 through 200. If the result of step 300 indicates that interpolation is to be performed in a vertical direction, the values of C(i, j) and D(i, j) are determined according to steps of pseudocode 390 through 450 in a manner similar to steps of pseudocode 220 through 280 discussed above.

Figure 7:
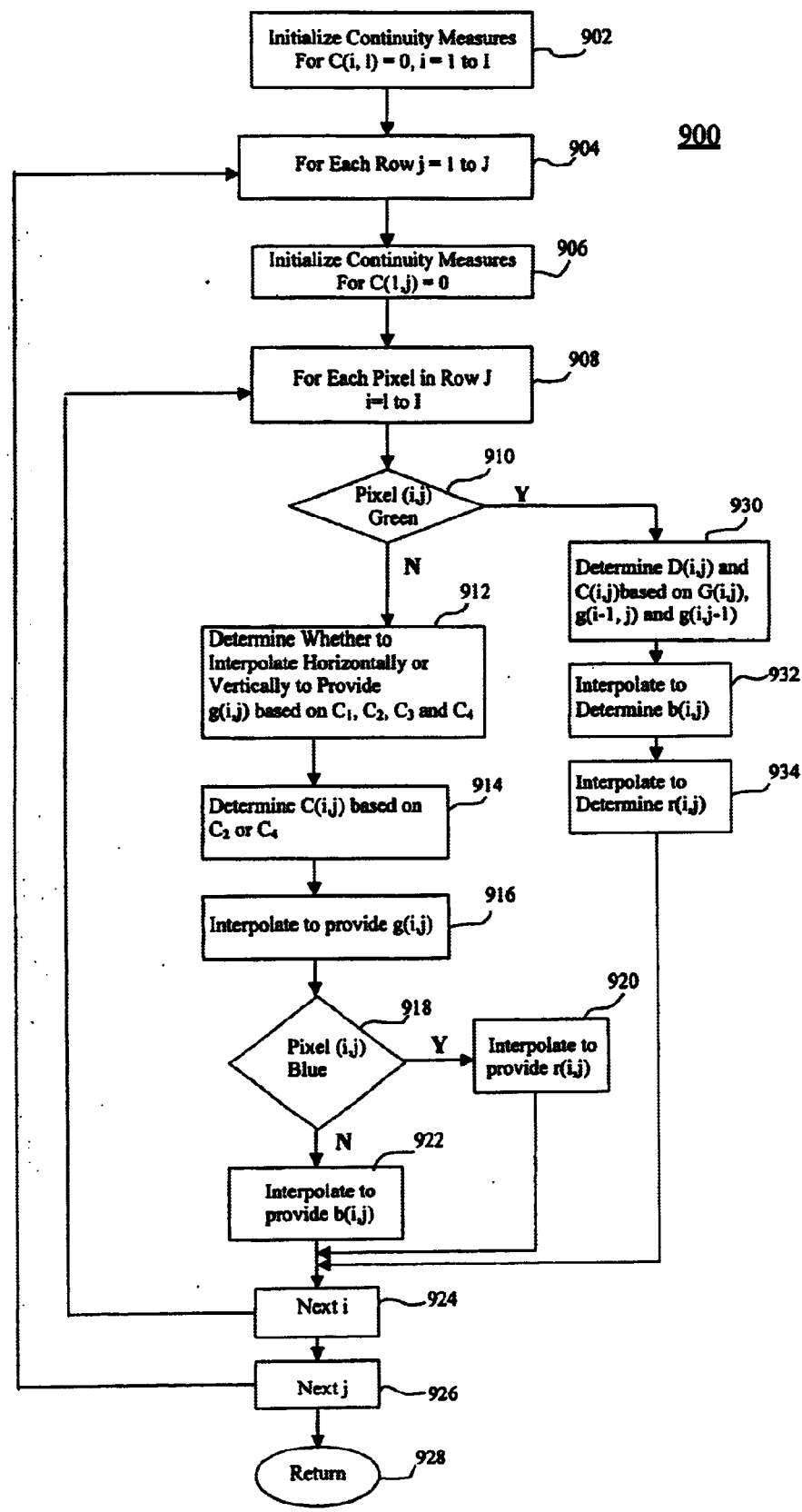
FIG. 7 shows a flow diagrams illustrating an embodiment for a process performed at the color interpolation step of the embodiment of FIG. 3.

FIG. 7 shows a flow diagram illustrating a process for performing the color interpolation step 112 discussed above with reference to FIG. 3. In the illustrated embodiment, this color image data includes a single digital value representing an intensity of photoexposure at each pixel location in the imaging sensor 12 corresponding to one of the color channels. Steps 904 and 908 define outer and inner loops for determining continuity measures C(i, j), interpolation directions D(i, j) and interpolated color image data at each pixel location (i, j) for imaging data collected at a Bayer pattern imaging array as illustrated in FIG. 2A.

The embodiment illustrated in FIG. 7 defines the imaging array as having J rows with each row having I number of pixels. Referring to FIG. 5, the embodiment shown in FIG. 7 further defines the first pixel location at an upper left corner (i.e., pixel location (1, 1)) increasing to the last pixel location at a lower right corner (i.e., pixel location (I, J)). Accordingly, before processing on the first row at step 904, step 902 initializes continuity measures for the first row. Similarly, before processing pixels in each row, step 906 initializes continuity measures for the first element in the first row. Steps 912 and 914 determine the continuity measures C(i, j) and the interpolation directions D(i, j) for all red and blue pixel locations according to the steps of pseudocode 100 through 280 discussed above. Step 916 determines interpolated green color image data g(i, j) at red and blue pixel locations according to equations (1) and (2) above.

If the pixel at location (i, j) is either a red or blue pixel, the remaining color image data is interpolated either horizontally or vertically based upon interpolation direction D(i, j) determined at step 912. If the pixel at location (i, j) is a blue pixel, step 920 interpolates to determine the color image data for red, r(i, j) according to the following pseudocode steps:

```
500    If D(i,j) = 1 { // interpolate horizontally
510        dGm = f [| g(i,j) − G(i−1, j) |]
520        dGp = f [| g(i,j) − G(i+1, j) |]
530        Rm = [R(i−1, j−1) + R(i+1, j−1)] / 2
540        Rp = [R(i+1, j+1) + R(i−1, j+1)] / 2
550        r(i,j) = dGm * Rp + dGp * Rm) / (dGx + dGy + ε)
560    } else {                     // interpolate vertically
570        dGm = f [ | g(i,j) − G(i, j−1) | ]
580        dGp = f [ | g(i,j) − G(i, j+1) | ]
590        Rm = [R(i−1, j−1) + R(i−1, j+1)] / 2
600        Rp = [R(i+1, j+1) + R(i+1, j−1)] / 2
610        r(i,j) = (dGm * Rp + dGp * Rm) / (dGx + dGy + ε)
``` where: f (•) is a selected monotonically increasing function, such as a linear or quadratic function, and ε is a selected constant.

If the pixel at location (i, j) is a red pixel, step 922 interpolates to determine the color image data for blue, b(i, j) for the pixel location (i, j) according to the following steps of pseudocode:

```
650    D(i,j) = 1 { // interpolate horizontally
660        dGm = f [| g(i,j) − G(i−1, j) |]
670        dGp = f [| g(i,j) − G(i+1, j) |]
680        Bm = [B(i−1, j−1) + B(i+1, j−1)] / 2
690        Bp = [B(i+1, j+1) + B(i−1, j+1)] / 2
700        b(i,j) = (dGm * Bp + dGp * Bm) / (dGx + dGy + ε)
750    } else {                     // interpolate vertically
760        dGm = f [ | g(i,j) − G(i, j−1) | ]
770        dGp = f [ | g(i,j) − G(i, j+1) | ]
780        Bm = [B(i−1, j−1) + B(i−1, j+1)] / 2
790        Bp = [B(i+1, j+1) + B(i+1, j−1)] / 2
800        b(i,j) = (dGm * Bp + dGp * Bm) / (dGx + dGy + ε)
```

Step 930 preferably determines the continuity measures C(i, j) and interpolation directions D(i, j) for green pixel locations according to the steps of pseudocode 300 through 460 illustrated above. Steps 932 and 934 preferably determine the interpolated red and blue color image data for the pixel location G(i, j) according to a local gradient about the pixel location (i, j). For the case where the pixel G(i, j) is in a row of alternating green and red pixels (i.e., the case illustrated in FIG. 4C), the color image data for red and blue is preferably determined as follows:

$$r(i,j)=[dGmm*R(i+1, j)+dGpm*R(i-1, j)+dGpp*R(i-1, j)+dGmp*R(i+1, j)]/(dGmm+dGpm+dGpp+dGmp) \quad (3)$$

$$b(i,j)=[dGmm*B(i, j+1)+dGpm*B(i, j+1)+dGpp*B(i, j-1)+dGmp*B(i, j-1)](dGmm+dGpm+dGpp+dGmp) \quad (4)$$

where:

$$dGmm=f[|G(i-1, j-1)-G(i, j)|]$$

$$dGpm=f[|G(i+1, j-1)-G(i, j)|]$$

$$dGpp=f[|G(i+1, j+1)-G(i, j)|]$$

$$dGmp=f[|G(i-1, j+1)-G(i, j)|]$$

f (•) is a selected monotonically increasing function, such as a linear or quadratic function.

For the case where the pixel G(i,j) is in a row of alternating green and blue pixels (i.e., the case illustrated in FIG. 4D), the color image data for red and blue is preferably as follows:

$$r(i,j)=[dGmm*R(i, j+1)+dGpm*R(i, j+1)+dGpp*R(i, j-1)+dgmp*R(i, j-1)]/(dGrnm+dGpm+dGpp+dGmp) \quad (5)$$

$$b(i,j)=[dGnm*B(i+1, j)+dGpm*B(i-1, j)+dGpp*B(i-1, j)+dGmp*B(i+1, j)]/(dGmm+dGpm+dGpp+dGmp) \quad (6)$$

where dGmm, dGpm, dGpp and Gmp are as defined above.

Figure 8:
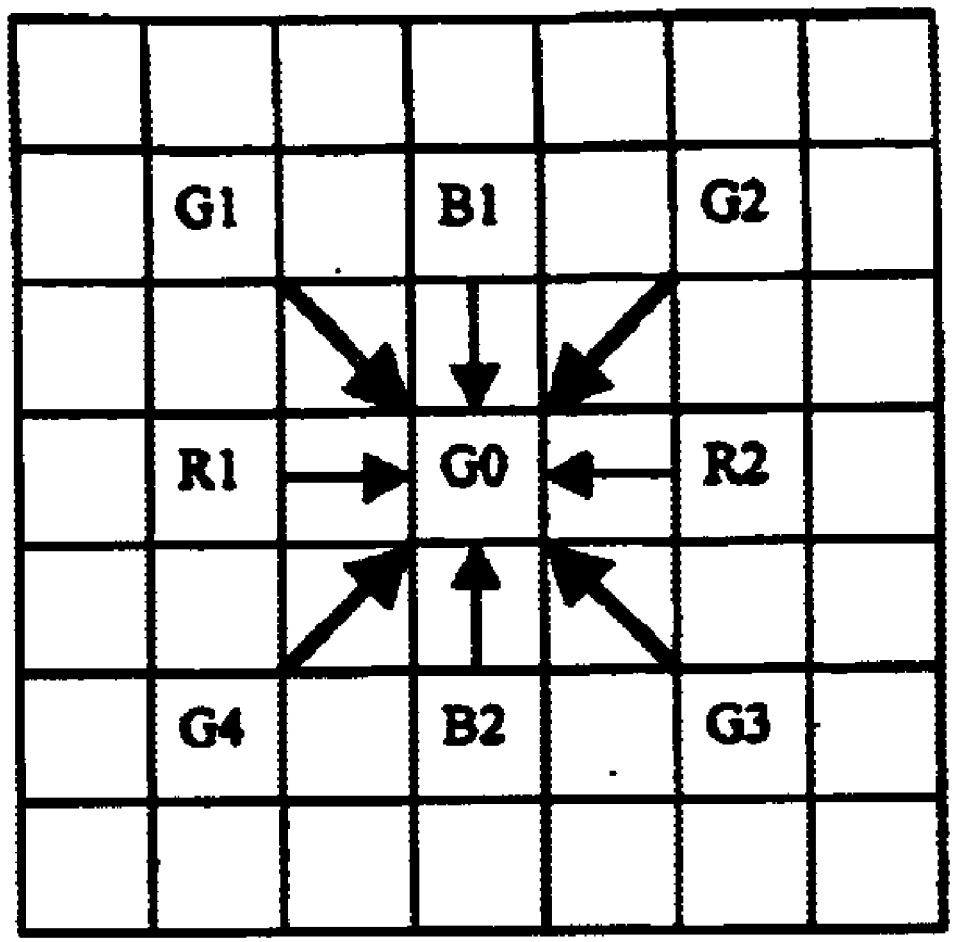
FIG. 8 illustrates a process of interpolating red and blue color image data to provide red and blue intensity values at green pixel locations.

FIG. 8 illustrates the process of interpolating to provide red and blue color image data at a green pixel location G(i, j) according to equations (3) and (4). In particular, FIG. 8 illustrates the case where the center green pixel lies in a row of alternating red and green pixels (i.e., as illustrated in FIG. 4C). The double arrows depict magnitude computations and the single arrows depict interpolation contributions. Thus, the calculated magnitude computations from the neighboring green pixels are applied to appropriately weight the contributions of the neighboring red and blue pixels to the interpolated red and blue pixel values r(i, j) and b(i, j).

While the description above refers to particular embodiments of the present invention, it will be understood that many modifications including, but not limited to, interpolation among larger pixel neighborhoods by selecting an interpolation direction among three or more interpolation directions, may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of processing data associated with an array of pixels arranged in two dimensions, each pixel corresponding with one of a plurality of distinct spectral regions and being associated with a value representative of an intensity of photoexposure at a pixel location in the array, the method comprising:

for at least one pixel location being associated with a first one of the plurality of spectral regions, selecting to interpolate in exactly one direction of a plurality of directions in the array based upon an intensity gradient at the pixel location and a continuity bias representative of a trend in changes of intensity in pixels neighboring the at least one pixel location; and determining a value representative of an intensity in a second one of the plurality of spectral regions distinct from the first spectral region to be associated with the at least one pixel location by interpolating among values representative of an intensity of photoexposure in the second spectral region in two or more neighboring pixels in a first column adjacent to the at least one pixel location, and interpolating among values representative of an intensity of photoexposure in the second spectral region in two or more neighboring pixels of a second column adjacent to the at least one pixel location, the neighboring pixels in the first column and the neighboring pixels of the second column being aligned along the selected direction, and the first and second columns being separated by the at least one pixel location.

2. The method of claim 1, the method further comprising determining the value representative of the intensity in the second spectral region based upon a weighted combination of the interpolation of values in the first column and the second column.

3. A method of processing data associated with an array of pixels arranged in two dimensions, each pixel corresponding with one of a plurality of distinct spectral regions and being associated with a value representative of an intensity of photoexposure at a pixel location in the array, the method comprising:

for at least one pixel location being associated with a first one of the plurality of spectral regions, selecting to interpolate in exactly one direction of a plurality of directions in the array based upon an intensity gradient at the pixel location and a continuity bias representative of a trend in changes of intensity in pixels neighboring the at least one pixel location; and determining a value representative of an intensity in a second one of the plurality of spectral regions distinct from the first spectral region to be associated with the at least one pixel location by interpolating among values representative of an intensity of photoexposure in the second spectral region in two or more neighboring pixels in a first row adjacent to the at least one pixel location, and interpolating among values representative of an intensity of photoexposure in the second spectral region in two or more neighboring pixels of a second row adjacent to the at least one pixel location, the neighboring pixels in the first row and the neighboring pixels of the second row being aligned along the selected direction, and the first and second rows being separated by the at least one pixel location.

4. The method of claim 3, the method further comprising determining the value representative of the intensity in the second spectral region based upon a weighted combination of the interpolation of values in the first row and the second row.

5. A method of processing data associated with an array of pixels arranged in two dimensions, each pixel corresponding with one of a plurality of distinct spectral regions and being associated with a value representative of an intensity of photoexposure at a pixel location in the array, the method comprising:

maintaining a continuity measure at each pixel location representative of an intensity gradient in neighboring pixel locations based upon changes in values representative of an intensity of photoexposure in a selected one of the spectral regions in each of the two dimensions at about the pixel location;

determining a continuity bias as a weighted sum of continuity measures associated with the neighboring pixel locations;

for at least one pixel location being associated with a first one of the plurality of spectral regions, selecting to interpolate in exactly one direction of a plurality of directions in the array based upon an intensity gradient at the pixel location and the continuity bias representative of a trend in changes of intensity in pixels neighboring the at least one pixel location; and determining a value representative of an intensity in a second one of the plurality of spectral regions distinct from the first spectral region to be associated with the at least one pixel location by interpolating among values representative of an intensity of photoexposure in the second spectral region at two or more neighboring pixel locations in at least one set of neighboring pixels, the neighboring pixel locations being aligned along the selected direction.

6. The method of claim 5, wherein the continuity bias represents a degree of continuity of intensity changes in pixels neighboring the at least one pixel location in a first one of the plurality of directions in the array and the step of selecting to interpolate in exactly one of the plurality of directions in the array further includes selecting to interpolate in the first direction unless the intensity gradient at the pixel location indicates a degree of change in a second one of the plurality of directions which overrides the continuity bias.

7. The method of claim 5, wherein the step of selecting to interpolate in exactly one of the plurality of interpolation directions includes selecting the interpolation direction from between two substantially orthogonal interpolation directions in the array.

8. The method of claim 5, wherein the step of selecting to interpolate in exactly on of the plurality of interpolation directions includes selecting the interpolation direction from among at least three interpolation directions in the array.

9. In a camera, the camera having an imaging array of pixels and an optical system for projecting an image onto the imaging array, the pixels in the imaging array being arranged in two dimensions, each pixel being at a pixel location in the array and corresponding with one of a plurality of distinct spectral regions providing a signal representative of an intensity of photoexposure at the pixel location, the improvement comprising:

logic for selecting to interpolate, for at least one pixel location being associated with a first one of the plurality of spectral regions, in exactly one direction of a plurality of directions in the array based upon an intensity gradient at the pixel location and a continuity bias representative of a trend in changes of intensity in pixels neighboring the at least one pixel location; and logic for determining a value representative of an intensity in a second one of the plurality of spectral regions distinct from the first spectral region to be associated with the at least one pixel location by interpolating among values representative of an intensity of photoexposure in the second spectral region in two or more neighboring pixels in a first column adjacent to the at least one pixel location, and interpolating among values representative of an intensity of photoexposure in the second spectral region in two or more neighboring pixels of a second column adjacent to the at least one pixel location, the neighboring pixels in the first column and the neighboring pixels of the second column being aligned along the selected direction, and the first and second columns being separated by the at least one pixel location.

10. The camera of claim 9, the improvement further including logic for determining the value representative of the intensity in the second spectral region based upon a weighted combination of the interpolation of values in the first column and the second column.

11. In a camera, the camera having an imaging array of pixels and an optical system for projecting an image onto the imaging array, the pixels in the imaging array being arranged in two dimensions, each pixel being at a pixel location in the array and corresponding with one of a plurality of distinct spectral regions providing a signal representative of an intensity of photoexposure at the pixel location, the improvement comprising:

logic for selecting to interpolate, for at least one pixel location being associated with a first one of the plurality of spectral regions, in exactly one direction of a plurality of directions in the array based upon an intensity gradient at the pixel location and a continuity bias representative of a trend in changes of intensity in pixels neighboring the at least one pixel location; and logic for determining a value representative of an intensity in a second one of the plurality of spectral regions distinct from the first spectral region to be associated with the at least one pixel location by interpolating among values representative of an intensity of photoexposure in the second spectral region in two or more neighboring pixels in a first row adjacent to the at least one pixel location, and interpolating among values representative of an intensity of photoexposure in the second spectral region in two or more neighboring pixels of a second row adjacent to the at least one pixel location, the neighboring pixels in the first row and the neighboring pixels of the second row being aligned along the selected direction, and the first and second rows being separated by the at least one pixel location.

12. The camera of 11, the improvement further comprising logic for determining the value representative of the intensity in the second spectral region based upon a weighted combination of the interpolation of values in the first row and the second row.

13. In a camera, the camera having an imaging array of pixels and an optical system for projecting an image onto the imaging array, the pixels in the imaging array being arranged in two dimensions, each pixel being at a pixel location in the array and corresponding with one of a plurality of distinct spectral regions providing a signal representative of an intensity of photoexposure at the pixel location, the improvement comprising:

logic for maintaining a continuity measure at each pixel location representative of an intensity gradient in neighboring pixel locations based upon changes in values representative of an intensity of photoexposure in a selected one of the spectral regions in each of the two dimensions at about the pixel location;

logic for determining a continuity bias as a weighted sum of continuity measures associated with the neighboring pixel locations;

logic for selecting to interpolate, for at least one pixel location being associated with a first one of the plurality of spectral regions, in exactly one of directions in the array based upon an intensity gradient at the pixel location and the continuity bias representative of a trend in changes of intensity in pixels neighboring the at least one pixel location; and logic for determining a value representative of an intensity in a second one of the plurality of spectral regions distinct from the first spectral region to be associated with the at least one pixel location by interpolating among values representative of an intensity of photoexposure in the second spectral region at two or more neighboring pixel locations in at least one set of neighboring pixels, the neighboring pixel locations being aligned along the selected direction.

14. The camera of claim 13, wherein the continuity bias represents a degree of continuity of intensity changes in pixels neighboring the at least one pixel location in a first one of the plurality of directions in the array and the step of selecting to interpolate in exactly one of the plurality of directions further includes selecting to interpolate in the first direction unless the intensity gradient at the pixel location indicates a degree of change in a second one of the plurality of directions which overrides the continuity bias.

15. The camera of claim 13, wherein the logic for selecting to interpolate in exactly one of the plurality of interpolation directions selects the interpolation direction from between two substantially orthogonal interpolation directions in the array.

16. The camera of claim 13, wherein the logic for selecting to interpolate in exactly one of the plurality of interpolation directions selects the interpolation direction from among at least three interpolation directions in the array.

17. A computer readable medium for use in conjunction with image data collected at an imaging array of pixels arranged in two dimensions, the image data including for each pixel location in the array a value representative of an intensity of photoexposure at the pixel location in one of a plurality of distinct spectral regions, the computer readable medium including computer readable instructions encoded thereon for performing the following:

for at least one pixel location being associated with a first one of the plurality of spectral regions, selecting to interpolate in exactly one direction of a plurality of directions in the array based upon an intensity gradient at the pixel location and a continuity bias representative of a trend in changes of intensity in pixels neighboring the at least one pixel location; and determining a value representative of an intensity in a second one of the plurality of spectral regions distinct from the first spectral region to be associated with the at least one pixel location by interpolating among values representative of an intensity of photoexposure in the second spectral region in two or more neighboring pixels in a first column adjacent to the at least one pixel location, and interpolating among values representative of an intensity of photoexposure in the second spectral region in two or more neighboring pixels of a second column adjacent to the at least one pixel location, the neighboring pixels in the first column and the neighboring pixels of the second column being aligned along the selected direction, and the first and second columns being separated by the at least one pixel location.

18. The computer readable medium of claim 17, the computer readable medium further including computer readable instructions encoded thereon for determining the value representative of the intensity in the second spectral region based upon a weighted combination of the interpolation of values in the first column and the second column.

19. A computer readable medium for use in conjunction with image data collected at an imaging array of pixels arranged in two dimensions, the image data including for each pixel location in the array a value representative of an intensity of photoexposure at the pixel location in one of a plurality of distinct spectral regions, the computer readable medium including computer readable instructions encoded thereon for performing the following:

for at least one pixel location being associated with a first one of the plurality of spectral regions, selecting to interpolate in exactly one direction of a plurality of directions in the array based upon an intensity gradient at the pixel location and a continuity bias representative of a trend in changes of intensity in pixels neighboring the at least one pixel location; and determining a value representative of an intensity in a second one of the plurality of spectral regions distinct from the first spectral region to be associated with the at least one pixel location by interpolating among values representative of an intensity of photoexposure in the second spectral region in two or more neighboring pixels in a first row adjacent to the at least one pixel location, and interpolating among values representative of an intensity of photoexposure in the second spectral region in two or more neighboring pixels of a second row adjacent to the at least one pixel location, the neighboring pixels in the first row and the neighboring pixels of the second row being aligned along the selected direction, and the first and second rows being separated by the at least one pixel location.

20. The computer readable medium of claim 19, the computer readable medium further including computer readable instructions encoded thereon for determining the value representative of the intensity in the second spectral region based upon a weighted combination of the interpolation of values in the first row and the second row.

21. A computer readable medium for use in conjunction with image data collected at an imaging array of pixels arranged in two dimensions, the image data including for each pixel location in the array a value representative of an intensity of photoexposure at the pixel location in one of a plurality of distinct spectral regions, the computer readable medium including computer readable instructions encoded thereon for performing the following:

maintaining a continuity measure at each pixel location representative of an intensity gradient in neighboring pixel locations based upon changes in values representative of an intensity of photoexposure in a selected one of the spectral regions in each of the two dimensions at about the pixel location;

determining a continuity bias as a weighted sum of continuity measures associated with the neighboring pixel locations;

for at least one pixel location being associated with a first one of the plurality of spectral regions, selecting to interpolate in exactly one of a plurality of directions in the array based upon an intensity gradient at the pixel location and the continuity bias representative of a trend in changes of intensity in pixels neighboring the at least one pixel location; and determining a value representative of an intensity in a second one of the plurality of spectral regions distinct from the first spectral region to be associated with the at least one pixel location by interpolating among values representative of an intensity of photoexposure in the second spectral region at two or more neighboring pixel locations in at least one set of neighboring pixels, the neighboring pixel locations being aligned along the selected direction.

22. The computer readable medium of claim 21, wherein the continuity bias represents a degree of continuity of intensity changes in pixels neighboring the at least one pixel location in a first one of the plurality of directions in the array and the step of selecting to interpolate in exactly one of the plurality of directions further includes selecting to interpolate in the first direction unless the intensity gradient at the pixel location indicates a degree of change in a second one of the plurality of directions which overrides the continuity bias.

23. The computer readable medium of claim 21, the computer readable medium further including computer readable instructions encoded thereon for selecting the interpolation direction from between two substantially orthogonal interpolation directions in the array.

24. The computer readable medium of claim 21, the computer readable medium further including computer readable instructions encoded thereon for selecting the interpolation direction from among at least three interpolation directions in the array.

25. An image processor for processing image data collected at an imaging array of pixels arranged in two dimensions, the image data including for each pixel location in the array a value representative of an intensity of photoexposure at the pixel location in one of a plurality of distinct spectral regions, the image processor comprising:

logic for selecting to interpolate, for at least one pixel location being associated with a first one of the plurality of spectral regions, in exactly one direction of a plurality of directions in the array based upon an intensity gradient at the pixel location and a continuity bias representative of a trend in changes of intensity in pixels neighboring the at least one pixel location; and logic for determining a value representative of an intensity in a second one of the plurality of spectral regions distinct from the first spectral region to be associated with the at least one pixel location by interpolating among values representative of an intensity of photoexposure in the second spectral region in two or more neighboring pixels in a first column adjacent to the at least one pixel location, and interpolating among values representative of an intensity of photoexposure in the second spectral region in two or more neighboring pixels of a second column adjacent to the at least one pixel location, the neighboring pixels in the first column and the neighboring pixels of the second column being aligned along the selected direction, and the first and second columns being separated by the at least one pixel location.

26. The image processor of claim 25, the image processor further including logic for determining the value representative of the intensity in the second spectral region based upon a weighted combination of the interpolation of values in the first column and the second column.

27. An image processor for processing image data collected at an imaging array of pixels arranged in two dimensions, the image data including for each pixel location in the array a value representative of an intensity of photoexposure at the pixel location in one of a plurality of distinct spectral regions, the image processor comprising:

logic for selecting to interpolate, for at least one pixel location being associated with a first one of the plurality of spectral regions, in exactly one direction of a plurality of directions in the array based upon an intensity gradient at the pixel location and a continuity bias representative of a trend in changes of intensity in pixels neighboring the at least one pixel location; and logic for determining a value representative of an intensity in a second one of the plurality of spectral regions distinct from the first spectral region to be associated with the at least one pixel location by interpolating among values representative of an intensity of photoexposure in the second spectral region in two or more neighboring pixels in a first row adjacent to the at least one pixel location, and interpolating among values representative of an intensity of photoexposure in the second spectral region in two or more neighboring pixels of a second row adjacent to the at least one pixel location, the neighboring pixels in the first row and the neighboring pixels of the second row being aligned along the selected direction, and the first and second rows being separated by the at least one pixel location.

28. The image processor claim 27, the image processor further comprising logic for determining the value representative of the intensity in the second spectral region based upon a weighted combination of the interpolation of values in the first row and the second row.

29. An image processor for processing image data collected at an imaging array of pixels arranged in two dimensions, the image data including for each pixel location in the array a value representative of an intensity of photoexposure at the pixel location in one of a plurality of distinct spectral regions, the image processor comprising:

logic for maintaining a continuity measure at each pixel location representative of an intensity gradient in neighboring pixel locations based upon changes in values representative of an intensity of photoexposure in a selected one of the spectral regions in each of the two dimensions at about the pixel location;

logic for determining a continuity bias as a weighted sum of continuity measures associated with the neighboring pixel locations;

logic for selecting to interpolate, for at least one pixel location being associated with a first one of the plurality of spectral regions, in exactly one direction in the array based upon an intensity gradient at the pixel location and a continuity bias representative of a trend in changes of intensity in pixels neighboring the at least one pixel location; and logic for determining a value representative of an intensity in a second one of the plurality of spectral regions distinct from the first spectral region to be associated with the at least one pixel location by interpolating among values representative of an intensity of photoexposure in the second spectral region at two or more neighboring pixel locations in at least one set of neighboring pixels, the neighboring pixel locations being aligned alone the selected direction.

30. The image processor of claim 29, wherein the continuity bias represents a degree of continuity of intensity changes in pixels neighboring the at least one pixel location in a first one of the plurality of directions and the step of selecting to interpolate in exactly one of the plurality of directions includes selecting to interpolate in the first direction unless the intensity gradient at the pixel location indicates a degree of change in a second one of the plurality of directions which overrides the continuity bias.

31. The image processor of claim 29, wherein the logic for selecting to interpolate in exactly one of the plurality of interpolation directions selects the interpolation direction from between two substantially orthogonal interpolation directions in the array.

32. The image processor of claim 29, wherein the logic for selecting to interpolate in exactly one of the plurality of interpolation directions selects the interpolation direction from among at least three interpolation directions in the array.

* * * * *